(12) United States Patent
Frick

(10) Patent No.: US 9,730,460 B1
(45) Date of Patent: Aug. 15, 2017

(54) METHOD OF PREPARING AND SELLING PARTY FOOD

(71) Applicant: Terry A. Frick, Sheffield Lake, OH (US)

(72) Inventor: Terry A. Frick, Sheffield Lake, OH (US)

( * ) Notice: Subject to any disclaimer, the term of this patent is extended or adjusted under 35 U.S.C. 154(b) by 454 days.

(21) Appl. No.: 13/910,797

(22) Filed: Jun. 5, 2013

Related U.S. Application Data

(60) Provisional application No. 61/655,518, filed on Jun. 5, 2012.

(51) Int. Cl.
*A21D 8/02* (2006.01)
*A21D 13/00* (2017.01)

(52) U.S. Cl.
CPC .................. *A21D 13/007* (2013.01)

(58) Field of Classification Search
CPC .......... A21D 8/02; A21D 13/007; A21D 8/06; A21D 13/0067; A21D 13/0016; A21D 13/0006
USPC ... 426/582, 589, 8, 549, 19, 5, 62, 523, 275
See application file for complete search history.

(56) References Cited

U.S. PATENT DOCUMENTS

| | | | | |
|---|---|---|---|---|
| 3,669,007 A | * | 6/1972 | Pulici | 99/450.6 |
| 4,020,184 A | * | 4/1977 | Chesner | 426/19 |
| 5,640,897 A | * | 6/1997 | Fehr | 99/450.1 |

OTHER PUBLICATIONS

Coulson, Z. 1980. The Good Housekeeping illustrated Book. p. 440. Hearts Books. N.Y.*
Coulson, Z. 1980. The Good Houskeeping Illustrated Cookbook. Hearst Books, New York. p. 453.*

* cited by examiner

*Primary Examiner* — Hamid R Badr
(74) *Attorney, Agent, or Firm* — Bodi Law LLC

(57) ABSTRACT

A method of preparing and selling party foods for use in social situations, with the party foods including one or both of pull apart pepperoni rolls and an extra saucy pizza bagel.

7 Claims, 9 Drawing Sheets

US 9,730,460 B1

METHOD OF PREPARING AND SELLING PARTY FOOD

CROSS-REFERENCES TO RELATED APPLICATIONS

This application claims the benefit of U.S. provisional application Ser. No. 61/655,518, filed on Jun. 5, 2012, and incorporated herein by reference in its entirety.

FIELD OF THE INVENTION

This application relates generally to a method of preparing and selling finger foods for use in party situations.

BACKGROUND OF THE INVENTION

Generally, when people attend parties, they don't want to pause in their social activities to formally sit and eat. Desirable are foods that allow party goers to continue to socialize or participate in watching sporting events while eating.

SUMMARY OF THE INVENTION

Provided are a plurality of example embodiments, including, but not limited to a method of preparing and selling various finger foods that are useful for party situations, or where a person must eat "on-the-go".

A "Pull-a-Party™" is provided that is created by the process of the mixing of the dough, measuring the dough, filling the dough with Pepperoni, cutting them in half, folding into small balls, placing on tray, baking, packaging and selling, reheating, and then pulling them apart for serving and consuming.

Further provided is a method of serving pepperoni rolls, comprising the steps of:
preparing a dough mixture;
rolling and cutting the dough mixture into a plurality of pieces;
topping the pieces with pepperoni;
rolling the pepperoni topped pieces to form an elongated roll;
cutting the elongated roll into at least two pieces;
tucking under at least one end of each one of the cut pieces;
arranging the tucked under cut pieces onto a baking pan into a circular pattern having at least two concentric circles;
baking the arranged pieces to form a baked product where the individual pieces that were arranged on the baking pan are connected together with clearly defined delineations between the individual pieces; and
serving the baked product by pulling and breaking off one of the pieces from the backed product for an individual serving.

Also provided is a Saucy Bagel that is created by the process of cutting and shaping, dipping, proofing, saucing, cheesing, baking, packaging and selling, reheating, and serving.

Further provided is a method of manufacturing a bagel, comprising the steps of:
preparing a dough mixture including a leavening ingredient;
forming the dough mixture into a plurality of raw bagels having a bagel shape;
dipping the raw bagels into a sauce to form dipped bagels;
allowing the dipped bagels to rise to form risen bagels;
topping the risen bagels with more of said sauce or another sauce to form sauced bagels; and
baking the bagels.

Also provided is a method of manufacturing a bagel, comprising the steps of:
preparing a dough mixture;
forming the dough mixture into a plurality of raw bagels having a bagel shape;
dipping the raw bagels into a sauce to form dipped bagels;
allowing the dipped bagels to rest for a period of time;
topping the rested bagels with more of said sauce or another sauce to form sauced bagels;
topping the sauced bagels with cheese;
baking the bagels topped with cheese; and
packaging the baked bagels for sale to consumers.

In addition are provided additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Saucy Bagel

Figure 1:
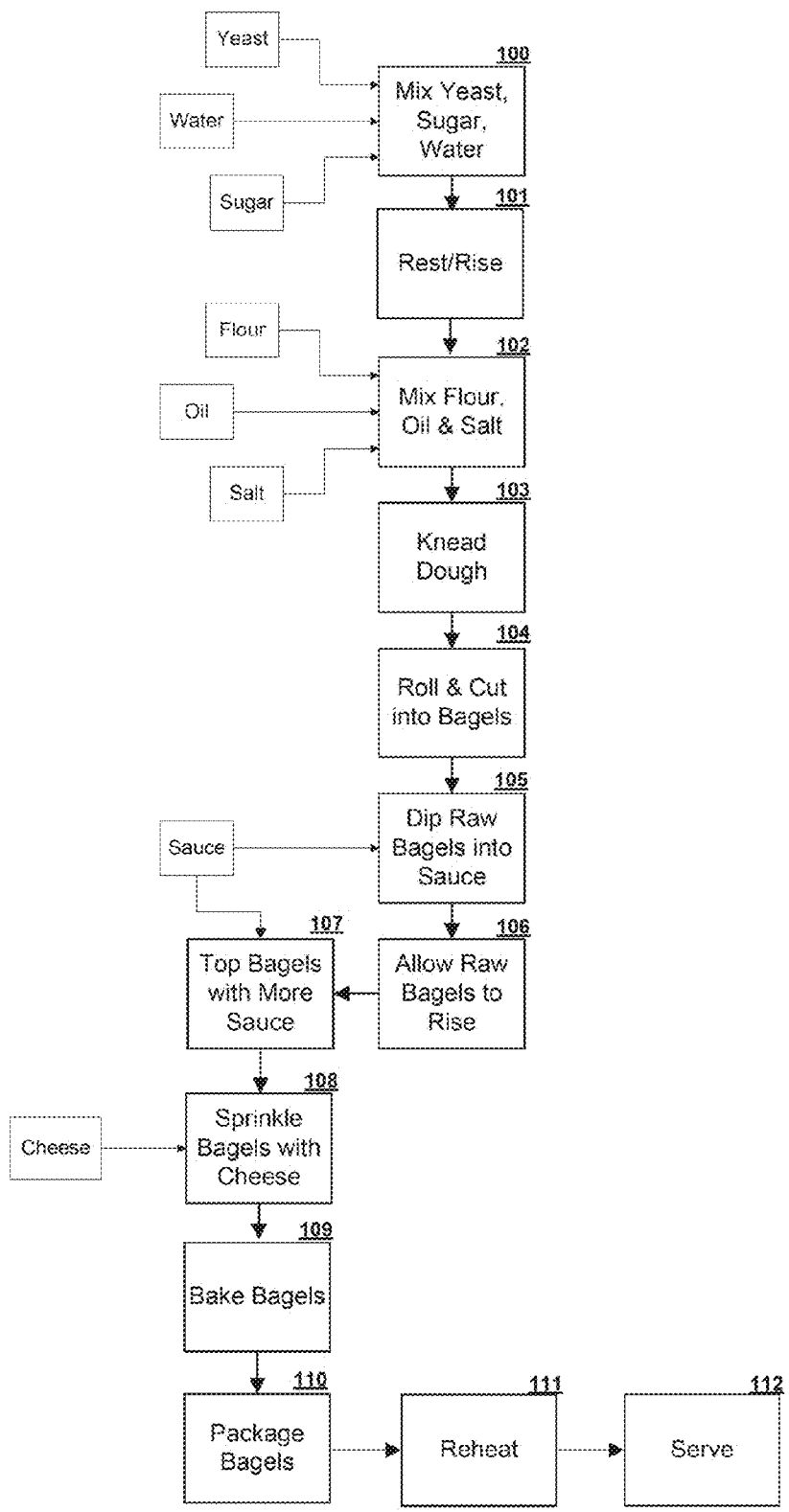
FIG. 1 is a flow chart showing an example of a process for making the saucy bagel.

The saucy bagel is basically a pizza-style bagel (e.g., a Pizagel™) that is made via a special process to increase its sauciness, making it particularly desirable as a meal substitute and especially tasty. The process for making the bagel is as follows:

The recipe for the bagel dough is a traditional process that can use a number of different proportions of ingredients to prepare the bagel, and hence the proportions of the ingredients can be modified according to the type of bagel desired. However, the process is modified in the manner of adding the sauce to the bagel in order to ensure that the bagel is particularly saucy and more like a traditional pizza in taste: FIG. 1 is a flow chart showing an example of the new process, and is described below.

Mix yeast and water (or other desired liquid) and sugar 100 and let sit (rise) for 10 minutes 101 to prepare the yeast. Note that for some recipes, another leavening ingredient might be used, such as baking powder, or leavening might even be left out for some recipes.

Add flour, oil and salt (and any other desired ingredients) 102 to the yeast mixture to form a dough.

Knead the dough 103.

Figure 2:
FIGS. 2-6 are photographs showing the saucy bagel.

Roll the dough and cut into bagels 104 (see FIG. 2).

Dip the raw bagels into pizza sauce 105, and allow the sauce dipped bagels to rise 106 (see FIG. 2). During this resting time, the sauce tends to dry a bit, ensuring that it adheres to the bagel, even if leavening is not used in the recipe. The time to rise will depend on the type and quality of yeast, and how dense or bready the end product is desired. The rise time can be minutes to hours.

Figure 3:
Figure 4:

Once sufficiently risen, the bagels are topped with more sauce 107 (See FIG. 3) typically using the same sauce as the dipping sauce, but if desired a different sauce could be used. For example, it might be desirable to use a thicker recipe, or a recipe that has other ingredients, such as chopped tomatoes, for the second saucing. The sauce-topped bagel is sprinkled with mozzarella cheese 108 (or another desired cheese, such as provolone or cheddar or parmesan, or a combination of these or other cheeses, for example), and baked 109 at 375 for 8-10 minutes (see FIG. 4), for example.

Figure 5:
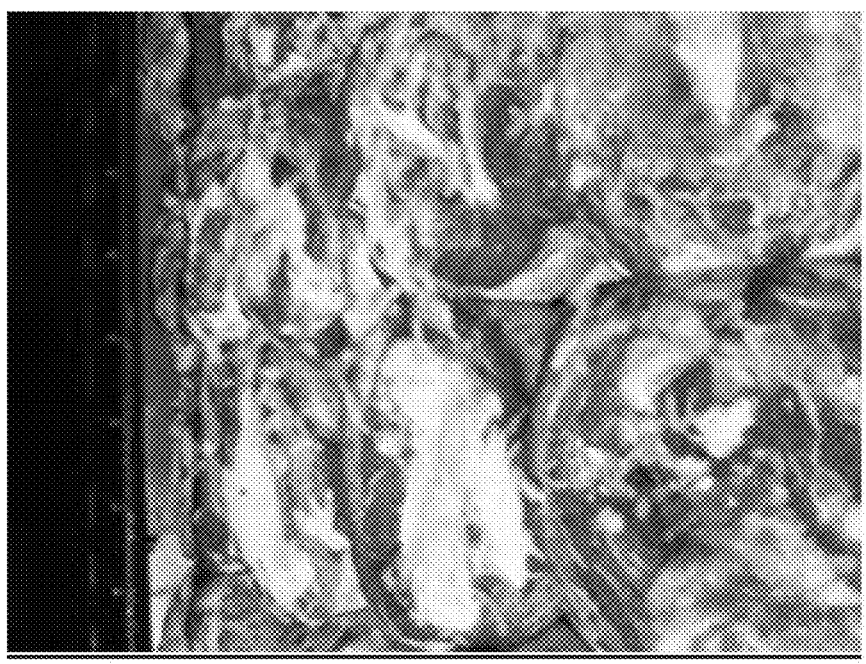
Figure 6:

The saucy bagels can then be eaten after baking, or they can be packaged 110 (see FIG. 5) to be stored or transported to retail stores for sale. The saucy bagel could be frozen after packaging for a longer shelf life. The Bagels can be warmed up later (reheated 111) by the consumer and served 112 to be consumed after reheating, although the bagels can also be consumed without reheating, if desired. It is the double saucing feature that makes this bagel unique and especially savory and enjoyable, and much more like a piece of pizza.

Pull-a-Party™ Pepperoni Rolls

This product is basically a modification to a peperoni roll that is made by a special process into a special form that is fun to eat, great for resale, and ideal for party environments.

The process starts with the mixing of the dough, which is basically any type of roll, bun, or other bread dough as desired.

Figure 7:
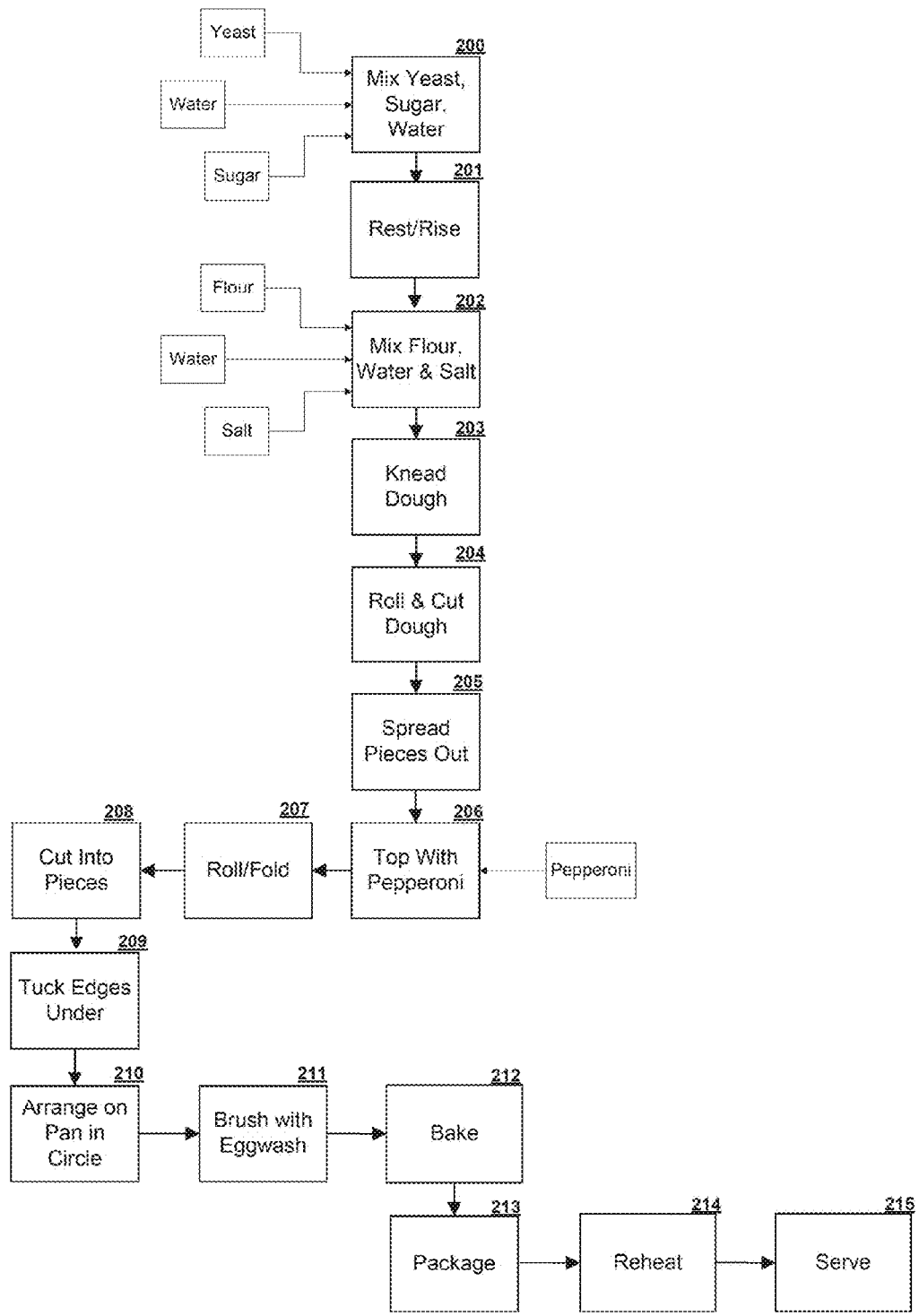
FIG. 7 is a flow chart showing an example of a process for making the pull-a-party pepperoni rolls.

FIG. 7 is a flow chart showing an example of the method of creating and serving the treat. First, yeast, water and sugar are mixed 200 and allowed to grow (rise) 201.

Water (or milk or other liquid), flour (any grain, typically wheat), salt, and other desired ingredients are added 202 to the yeast mixture to form the dough. The dough is kneaded 203 and may be allowed to rise, as desired, and re-kneaded, as desired, to form the desired consistency and texture.

The kneaded dough is rolled out and cut 204, for example into 2 ½ oz. pieces.

Figure 8:
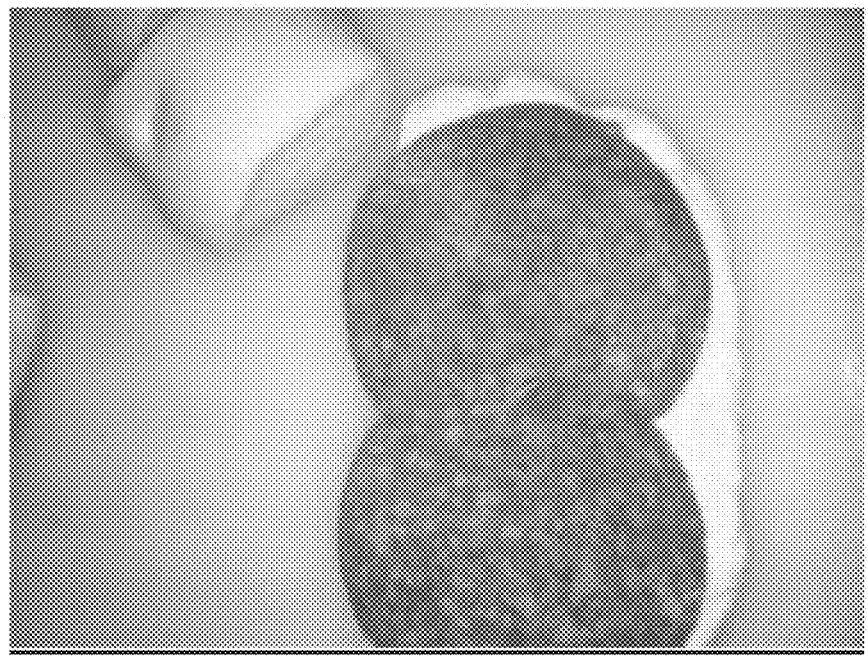
FIGS. 8-14 are photographs showing the pepperoni rolls.
Figure 9:
Figure 10:
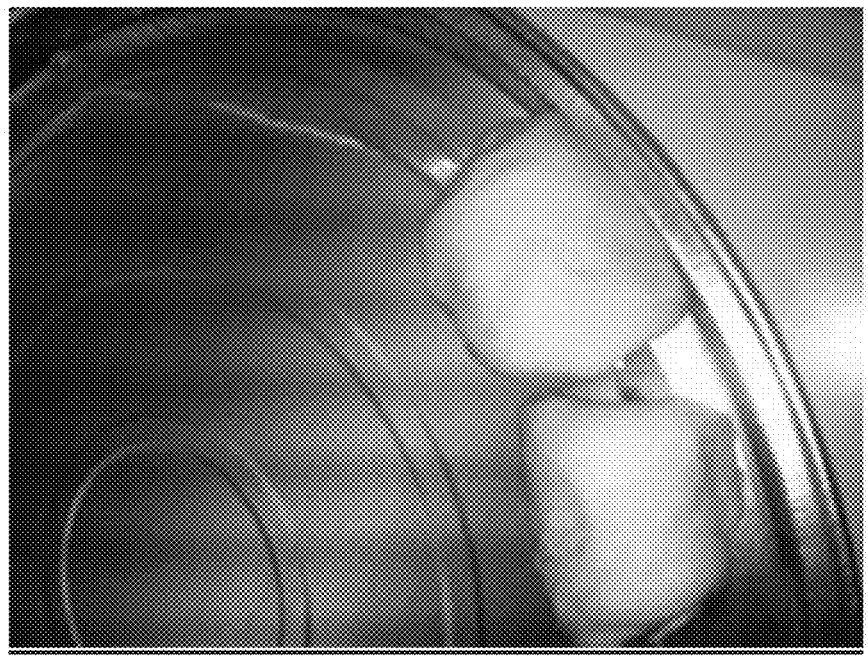
Figure 11:
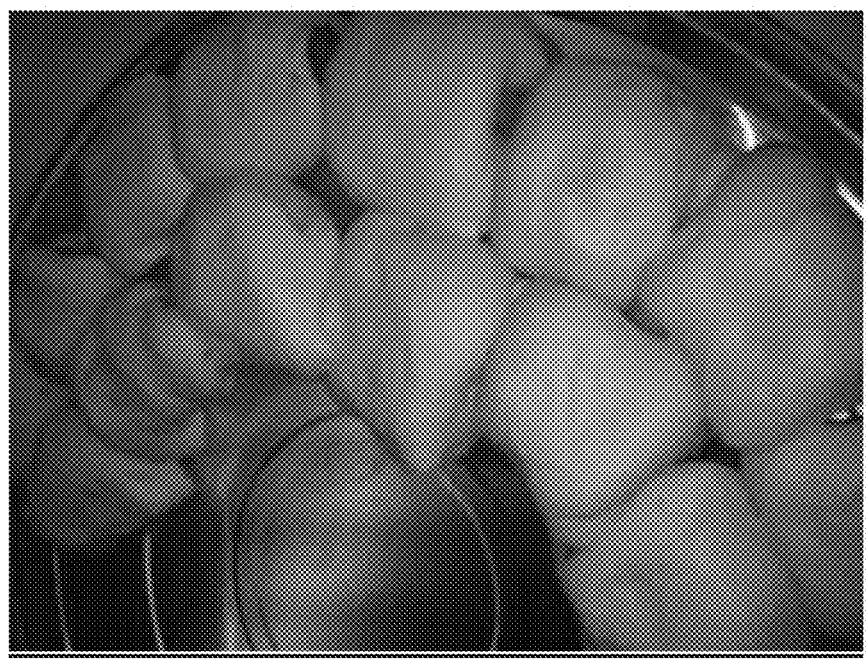

Each cut piece is then slightly spread out 205 on a working surface, and each piece is topped with 2 slices of pepperoni 206 (see FIG. 8). The pieces are then rolled (folded) 207, jelly roll style (see FIG. 9) to form an elongated roll. Each roll is then cut into 2 pieces 208, and the ends of the pieces are tucked under 209 (see FIG. 10) resulting in a more typical roll shape, and each piece placed on a baking pan (such as a foil pan, for example), arranged in a circular pattern into at least 2 rows 210 (see FIG. 11) to form concentric circles. The individual pieces should be arranged to be touching, or nearly touching, so that they bake into each other during baking. More rows could be used if desired to form a product having a larger form.

The arranged rolls are brushed with egg wash 211 (this step could be eliminated if desired, but adds shine to the end result) and baked 212 at 375 degrees F. for about 10 minutes, for example.

The resulting backed product is of an arrangement where the individual rolls have been baked into a solid form with the individual rolls (pieces) being connected to each other, but the individual rolls have clearly defined delineations between each other (where the borders to the individual rolls were prior to baking) easing the separation of the individual rolls (pieces) from each other for serving.

After baking, the rolls are ready to eat, or the product can be packaged for sale 213. After purchase, the rolls can be eaten cold, or the product reheated 214. The heated product is served 215 by breaking off (pulling off) the individual rolls from the solid form in a manner similar to "breaking bread" without a knife. Hence, the eating process is both fun and tasty.

Figure 12:
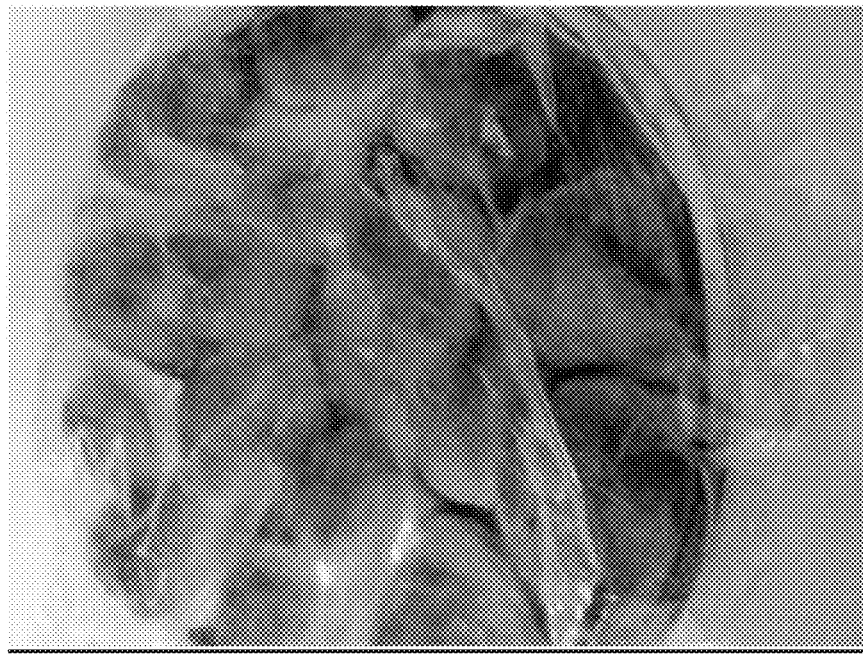
Figure 13:

FIGS. 12 and 13 show the product provided in various packages. Packaging for sale can be provided with the product in the tin pan, with a clear freezer bag over the product and a clear round label on the front and back. A dipping sauce can be packaged in a plastic bowl and placed in the bag or provided separately.

Another option is using a freezer bag with a handle on top (see FIG. 13). The product would be placed in the bag, so it can be stacked facing up in a bin, if desired, and people can grab the top. The pull a part bag would have a label on the top and back of the bag.

Figure 14:
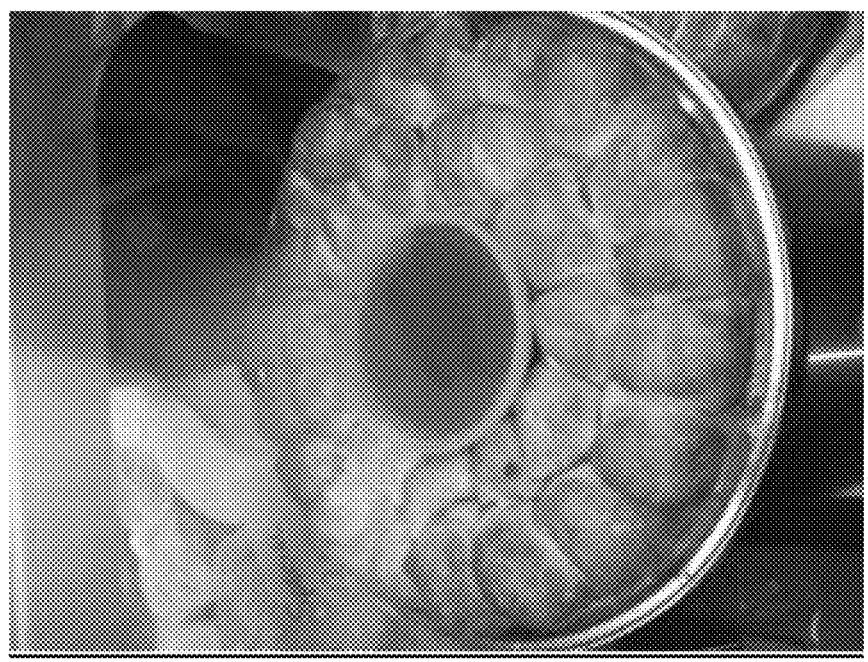

FIG. 14 shows a preferred arrangement of the product for display, packaging, sale, and/or use, where a dipping sauce is provided in the center of the product rolls. Note that the individual rolls are typically attached to each other in this arrangement, and hence an individual "pulls" (breaks) an individual roll out of the whole product in order to eat the individual roll, in the manner of "breaking bread", perhaps dipping it in the sauce before consuming.

If purchased pre-packaged, the product can be reheated in an oven prior to serving. It is then ready to eat, just pull apart a roll from the arrangement and pop into the mouth or take a bite. Dip into sauce, as desired. As described above, this product uses a unique roll and tuck process and provides a unique the pull-a-part experience that makes it fun and interesting.

Note that as an alternative, the product can be packaged for sale after the pieces are arranged on the baking pan, but prior to baking. In this situation, the result may be frozen after packaging, and the consumer will then bake the product at home, rather than merely reheating an already baked product. This may result in a fresher product, but one that can be stored in a freezer for a longer period before serving.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of manufacturing a bagel, comprising the steps of:
    preparing a dough mixture including a leavening ingredient;
    forming the dough mixture into a plurality of raw bagels having a bagel shape;
    dipping the raw bagels into a sauce to form dipped bagels;
    allowing the dipped bagels to rise to form risen bagels;
    topping the risen bagels with more of said sauce or another sauce to form sauced bagels; and
    baking the sauced bagels.

2. The method of claim 1, further comprising the step of topping the sauced bagels with cheese prior to baking the bagels.

3. The method of claim 1, further comprising the step of packaging the bagels for sale.

4. The method of claim 1, wherein the sauce used for topping the risen bagels is the same sauce used for dipping the raw bagels.

5. The method of claim 1, wherein the sauce used for topping the risen bagels is different than the sauce used for dipping the raw bagels.

6. The method of claim 1, wherein the leavening ingredient is yeast.

7. The method of claim 1 wherein the leavening ingredient is baking soda.

* * * * *